United States Patent [19]

Webster et al.

[11] 4,025,670

[45] May 24, 1977

[54] CONTINUOUS PROCESS FOR LINING PIPES

[75] Inventors: John David Webster; Thomas John Jewell, both of St. Austell, England

[73] Assignee: English Clays Lovering Pochin & Company Limited, St. Austell, England

[22] Filed: Nov. 4, 1974

[21] Appl. No.: 520,868

Related U.S. Application Data

[62] Division of Ser. No. 395,166, Sept. 7, 1973, Pat. No. 3,862,921.

[30] Foreign Application Priority Data

Sept. 14, 1972 United Kingdom ............ 42786/72

[52] U.S. Cl. .................... 427/231; 260/77.5 AA; 427/234; 427/239
[51] Int. Cl.² ............................................. B05D 7/22
[58] Field of Search .......... 427/231, 234, 239, 345, 427/240; 260/77.5 AA

[56] References Cited

UNITED STATES PATENTS 2,319,657  5/1943  Brown .............................. 427/234
3,498,820  3/1970  Hawkins ........................... 427/231

FOREIGN PATENTS OR APPLICATIONS

506,117  5/1939  United Kingdom .............. 427/234

*Primary Examiner*—Ronald H. Smith
*Assistant Examiner*—Stuart D. Frenkel
*Attorney, Agent, or Firm*—Larson, Taylor and Hinds

[57] ABSTRACT

A continuous process for lining pipes with thermosettable polymer made from prepolymer and curing agent, comprising the steps of: heating and degassing the prepolymer and storing it in a first storage tank; providing the curing agent in liquid form at a curing temperature in a second storage tank; recycling the prepolymer and the curing agent between the storage tanks and a mixing head which is selectively operable to mix and discharge the reagents; arranging each pipe with its longitudinal axis inclined at an angle to the horizontal; introducing a selected amount of the polymer mixture into the pipe at a predetermined rate so that the liquid material flows down along the pipe; and shifting the pipe to a horizontal position and spinning the pipe about its axis to distribute the material, spinning continuing until the material has set.

1 Claim, 9 Drawing Figures

CONTINUOUS PROCESS FOR LINING PIPES

This is a division, of application Ser. No. 395,166 filed Sept. 7, 1973 now U.S. Pat. No. 3,862,921.

This invention relates to the production of a polymer, for example polyurethane, from a prepolymer, for example a urethane elastomer, and a curing agent therefor, and is particularly concerned with the preparation of the two reagents in a continuous manner.

The invention is particularly, although not exclusively, applicable to the continuous production of polyurethane for lining the inside of steel pipes, by a centrifugal technique.

According to the present invention there is provided a process for the production of a polymer, for example, polyurethane, from a prepolymer, for example a urethane elastomer, and a curing agent therefor, the process comprising:

a. heating the prepolymer to a temperature in the range in which the curing agent reacts with the prepolymer in liquid form to cure the latter;

b. degassing the prepolymer;

c. transferring the heated and degassed prepolymer to a first storage tank which is maintained at a substantially constant temperature within the said range;

d. providing the curing agent in liquid form at a temperature at which it is capable of curing the prepolymer and below that at which the curing agent deteriorates;

e. storing the liquid curing agent in a second storage tank which is maintained at a substantially constant temperature below that at which the curing agent deteriorates;

f. transferring the heated prepolymer and the liquid curing agent continuously in recycling circuits from the first and second storage tanks respectively to discrete ducts in a mixing head and back to the respective storage tanks, the mixing head being operable continuously or intermittently, as required, to mix and then discharge the mixture of prepolymer and curing agent.

Advantageously, the liquid prepolymer is heated and degassed simultaneously in degassing apparatus. Of course, if the prepolymer is a solid or very viscous liquid at normal air temperatures, it is preferably preheated prior to feeding it to the degassing apparatus to form a liquid having a viscosity which permits the liquid to be thoroughly stirred and preheated throughout. Preferably, the amount of liquid prepolymer in the first storage tank is maintained within predetermined levels by automatically-operable means associated with the outlet of the degassing apparatus.

In the case in which the prepolymer is a urethane elastomer it may be an isocyanate-terminated polyether and the curing agent may be a diamine.

If the curing agent is a solid or very viscous liquid at normal temperatures it is necessary to heat it to a temperature at which it is liquid and at which it reacts with the prepolymer to cure the latter, prior to introducing the curing agent into the second storage tank. An example of such a curing agent which is solid at normal temperatures is 4,4'-methylene-bis(2-chloroaniline) (M.O.C.A.), and for heating this to the required temperature at which it is in liquid form it is preferable to use a suitable heating apparatus in which the heated liquid curing agent to be transferred to the second storage tank is kept apart from the solid material. Some curing agents are liquid at normal temperatures and they react with the prepolymer satisfactorily at ambient (i.e. normal) temperatures and in this case heating of the curing agent is not required. An example of such a curing agent is CAYTUR-21, which is a 50% dispersion of methylene dianiline/sodium chloride complex in di-octyl-phthalate, and which when mixed with prepolymer gives a pot life of 24 hours at ambient temperatures.

In the preparation of a solid polymer from a prepolymer such as urethane elastomer and a curing agent, the reagents are usually mixed in suitable proportions, depending upon the required final qualities of the cured polymer, at a temperature lying within a suitable curing range. Once mixed, the reagents begin to react and the curing process starts, the viscosity of the mix thereafter rising fairly rapidly during an initial period until the mix becomes almost solid; the curing of the polymer then continues over a longer period of time until the curing reaction is completed.

Generally speaking the curing process is more rapid at higher temperatures and the initial period within which the mix is still workable — referred to as the "pot life" — becomes shorter with increase in temperature. This is an important consideration when producing polymer which is to be moulded or cast, for example, since the working of the mix to the final shape must be carried out within the pot life period.

Another important consideration is the viscosity both of the reagents and of the mixture during the pot life period. At higher temperatures the viscosity of the reagents decreases enabling mixing of the reagents to be achieved more quickly and thoroughly. However, for most polyurethane reagents, for example, once they are heated they are susceptible of degradation, the degrading taking place more quickly at increased temperatures.

Furthermore the temperature of the mixed reagents does to some extent determine the viscosity during the pot life of the mixture, the higher the temperature the lower the viscosity.

The selection of the mixing temperature is therefore governed according to the required pot life which should be sufficient for working the polymer, and also according to the viscosity of the mix which should be such as to enable the polymer to be moulded, cast or otherwise processed within the pot life time available.

The temperature of the reagents prior to mixing is also governed by two factors, namely the viscosity of the reagents for adequate mixing and the risk of degradation of the reagents. On the one hand the reagents must be prepared for satisfactory mixing at the selected temperature and on the other hand the reagents cannot be kept at too high a temperature since they may degrade to an unacceptable condition before they are used.

In one application of the invention, a process of producing polyurethane from a urethane elastomer and a curing agent has been developed for the continuous production of polyurethane for the lining of pipes or other articles to be carried out in a continuous manner, the liquid urethane elastomer and its curing agent being mixed and during the pot life being injected into a preheated pipe. When a predetermined quantity of mix has been injected, the pipe is spun about its longitudinal axis to cause the still-workable mix to be distributed evenly around the inside of the pipe wall; spinning of the pipe is continued at a given temperature until the polyurethane sets to a rubbery solid whereafter spinning is stopped and the pipe is held at the given temperature until curing is almost complete.

The invention may be carried into practice in a number of ways but one specific embodiment will now be described, by way of example only, with reference to the accompanying drawings, in which.

In many applications, particularly in the mining industry, it is necessary to pump highly abrasive slurries and other liquids containing mineral solids through pipes over considerable distances, and it has been found that ordinary steel pipes suffer greatly from wear due to abrasion by the mineral solids.

To reduce the excessive wear it is proposed to line the steel pipes with a suitable polyurethane which in its cured state has a high tensile strength and resilience and very high resistance to abrasion. One polyurethane which has been found to be entirely satisfactory during testing is that made by reacting an isocyanate-terminated polyether and a diamine curing agent. The present invention is primarily concerned with the preparation of the reactants in such a manner as to enable the lining of the steel pipes to be carried out almost continuously.

In the specific process to be described the isocyanate-terminated polyether is Adiprene (Registered Trade Mark) and the curing agent is 4,4′-methylene-bis(2-chloroaniline) (M.O.C.A.). The Adiprene, preferably Adiprene L-100, is reacted with the MOCA curing agent to form linear high-molecular-weight polyurethane, the mixing and curing temperatures being selected to enable the lining technique to be carried out and to yield a highly consistent product.

The lining technique comprises generally injecting a predetermined quantity of the mixed reagents into the end of a preheated pipe which is inclined to allow the mixed liquid to flow down the pipe at a given rate, dependent on the viscosity of the mix. The term "pipe" as used in the specification and appended claims includes molds or other tubular or hollow cylindrical articles. The angle of inclination of the pipe and the rate of injection are selected according to the total amount of polyurethane to be injected and its viscosity in such a way that when the mix which is first injected reaches the lower end of the pipe, the correct quantity of mix has been poured into the pipe and is uniformly distributed along the length of the pipe. The pipe is then immediately lowered to a horizontal position and spinning of the pipe commenced to cause the mix to be distributed by centrifugal action evenly around the entire inside of the pipe to form a complete lining of substantially constant inside diameter. Spinning is continued until the mix has set and the spinning is then stopped; thereafter the pipe is held at a given temperature to complete the curing of the polyurethane.

The lining technique provides a satisfactory product if the mixing and curing temperatures are held within the range of 88°–115° C. and for this reason, in a specific installation, the injection, spinning and subsequent curing are also carried out at 110°±5° C. and the pipes are preheated to 110°±5° C. for approximately 1 hour before injection.

The preparation of the Adiprene and MOCA reactants are therefore carried out, according to the invention, for the purpose of making the reactants continuously available at temperatures and viscosities suitable for mixing and pouring yet consistent with the optimum temperature ranges for handling Adiprene and MOCA bearing in mind that degradation occurs in increasingly shorter periods with increased temperature of storage of the reactants prior to mixing.

The recommended range for handling Adiprene L-100 is 70°–100° C.; within this temperature range the polymer having good stability, low viscosity and may be degassed readily. At the upper end of the range the Adiprene will degrade to an unacceptable condition if held at that temperature for more than about 8 hours whereas at the lower end of the range the Adiprene may be kept for up to 140 hours before degrading too much.

For MOCA the recommended handling temperature is about 120° C. but it should not be heated above 140° C. or degradation will occur.

Figure 1:
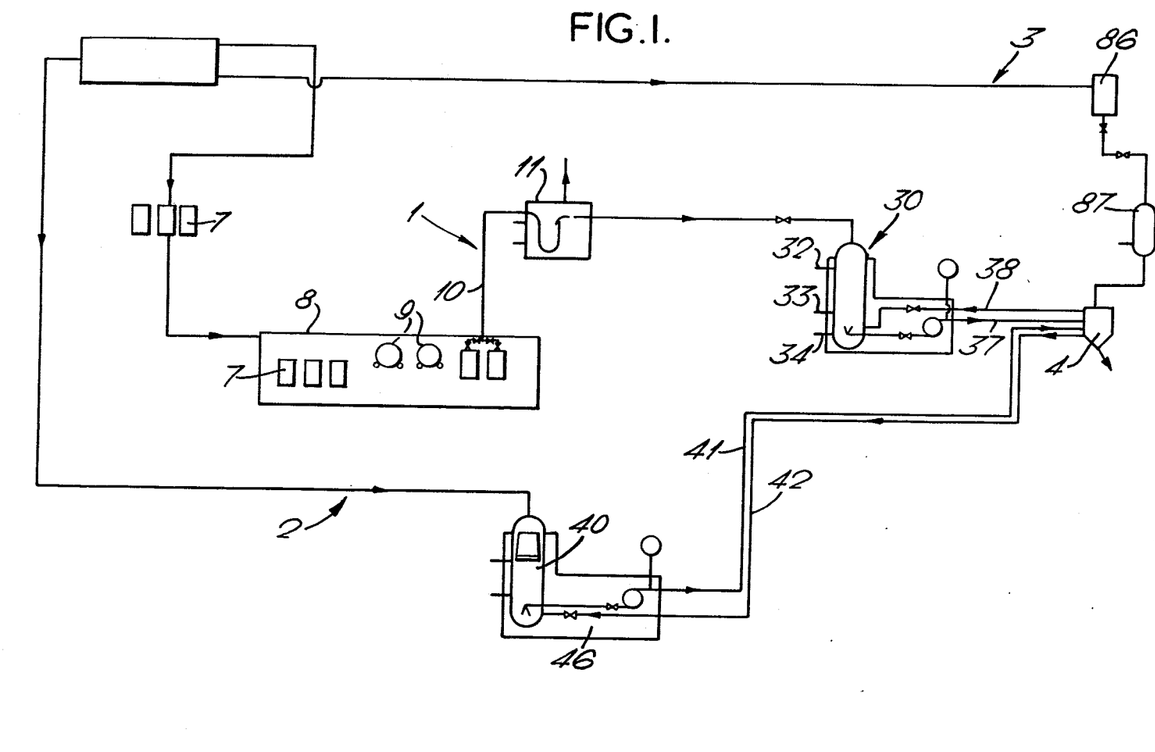
FIG. 1 is a flow sheet showing one method of preparation of polyurethane reactants.

A flow sheet showing the preparation of the two reactants, according to the present invention, is shown diagrammatically in FIG. 1. The system comprises generally three discrete supply lines, an Adiprene L-100 supply indicated generally at 1, a MOCA supply line indicated at 2 and a methylene chloride solvent supply line indicated at 3, the three supply lines being fed to a mixing and discharge head 4, the function of which is to mix the Adiprene and MOCA, as required, and to discharge the mixture into the pipes for carrying out the pipe lining procedure.

Referring firstly to the Adiprene supply line 1, there is provided basically a preheat and mixing room 8, a degassing and heating machine 11 and a storage tank 30 which is connected to the mixing head 4.

The Adiprene raw material is obtained in 26–45 gallon drums 7 which are stored until required at outside temperature. The first stage in the preparation of the Adiprene is carried out in the preheating and stirring room 8 where a number of drums, for example six, are stored on a suitable roller conveyor for up to 1½ days, the room being maintained at 40° C. so that the Adiprene is slowly melted (Adiprene melting point is 18° C.) and heated to that temperature at which the Adiprene is of sufficiently low viscosity to enable it to be stirred. The preheated drums are then moved, in turn, onto two stirring stations 9 within the room 8. Here the drums 7 are rolled continuously to agitate and mix the Adiprene thoroughly.

After rolling the drums 7 for several hours they are mounted on stands within the room 8 and connected to a supply pipe 10 for feeding the Adiprene to the degassing and heating machine 11. Two drums 7 are connected to the pipe 10 with a suitable change-over valve so that when one drum is empty the supply can immediately be switched over to the adjacent drum while the empty drum is replaced by another from the stirring station 9. This change-over of the valve can be arranged to be automatic to ensure continuous supply of Adiprene to the degassing machine 11.

Each drum has a drying tube, which is fitted to it before the Adiprene is fed out, the tube containing for example anhydrous calcium sulphate to remove moisture from the air which replaces the Adiprene as it is withdrawn for use. Otherwise moisture may enter the Adiprene and adversely affect the final product.

Figure 2:
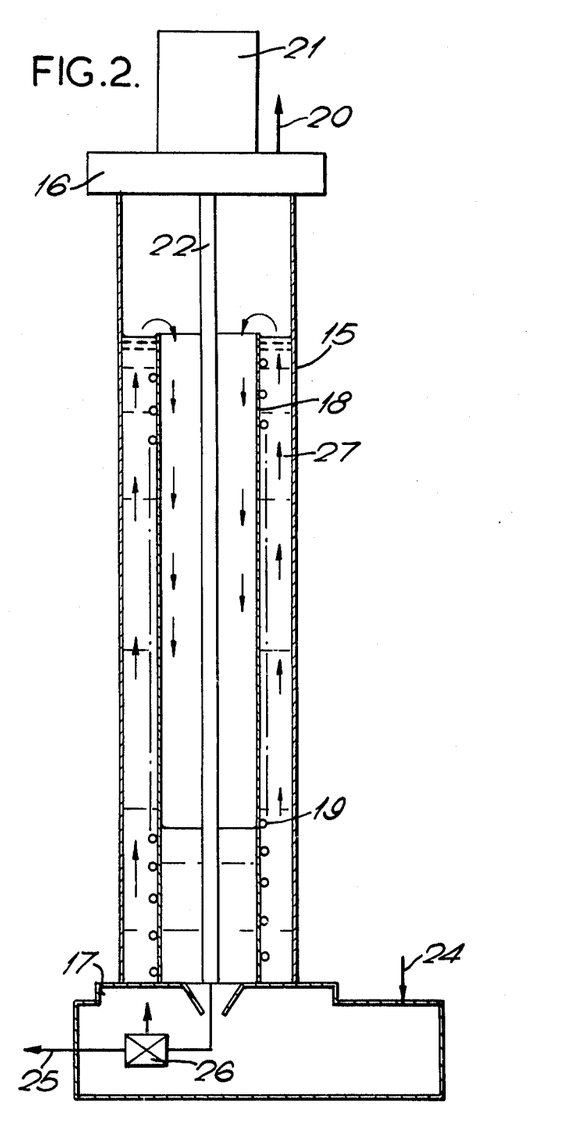
FIG. 2 is a sketch showing a degassing and heating machine for urethane elastomer.
Figure 3:
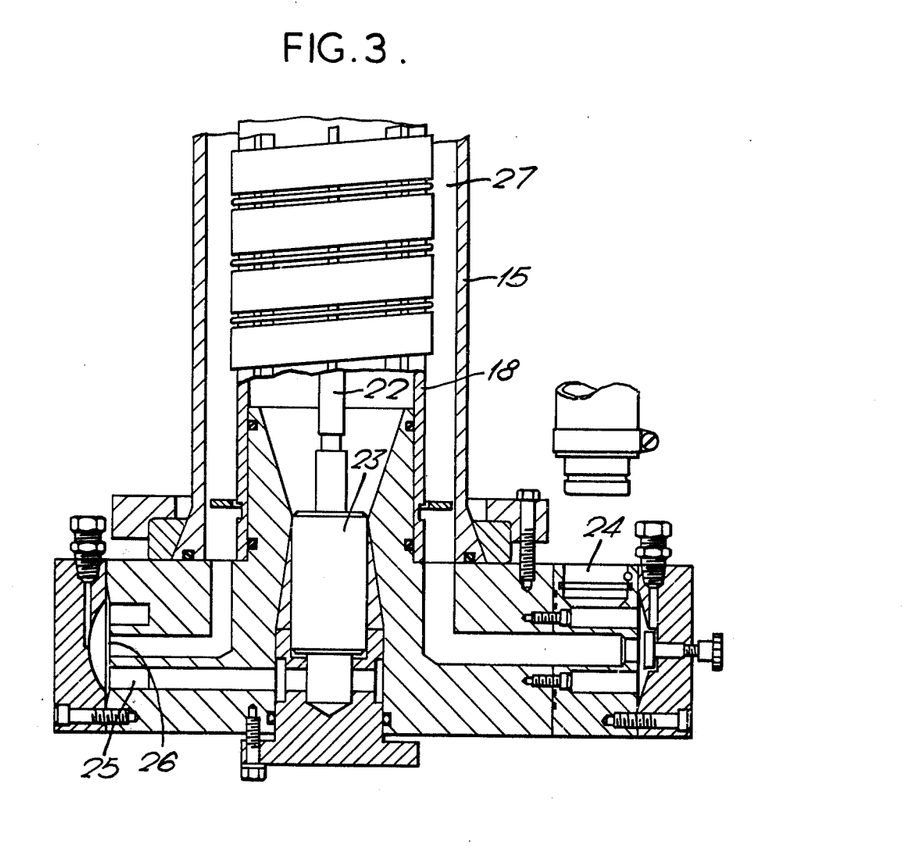
FIG. 3 is a sectioned view showing the details of part of the degassing machine of FIG. 2.

The degassing and heating machine 11 is a standard machine the construction of which is shown diagrammatically in FIG. 2 and in FIG. 3. It comprises essentially an outer glass tube 15 extending between an upper closure member 16 and a base 17, with an inner coaxially-arranged tube 18 extending upwardly from the base. The inner tube 18 is shorter than the outer tube 15, with an open upper end and is surrounded for most of its length by heating coils 19. A vacuum pump (not shown) applies a vacuum of 2–5 mm. mercury to the inside of the outer tube 15 via a gas extraction outlet 20. An air motor 21 is mounted on the upper closure member 16 which drives, via a shaft 22 extending down through the inner tube 18, a screw type Moyno pump 23 located on the base 17. The base is also provided with an Adiprene inlet 24, which is connected by the pipe 10 to the supply drum 7 in the preheat room 8, for supplying Adiprene to the annular space 27 between the inner and outer tubes 18 and 15, and an outlet 25 through which Adiprene can be delivered by the pump 23 to the storage tank 30. The outlet 25 is controlled by a solenoid-operated valve 26 which can be operated to close the outlet 25 and recirculate the Adiprene within the machine.

In operation the Adiprene is drawn into the annular space 27 by virtue of the reduced pressure within the outer tube 15 and as the Adiprene rises up the annular space 27 it is heated to 95° C. by the heating coils 19. The combination of the heating and the vacuum within the machine causes the Adiprene to foam as the entrained gas is removed and sucked out through the gas extraction outlet 20. The degassed and heated Adiprene then overflows the top of the inner tube 18 and collects in the bottom of that tube. From there the Adiprene is pumped by the screw pump 23 either to the storage tank 30 via the outlet 25 and an insulated line or back for recirculation up through the annular space 27 depending upon the setting of the valve 26 which is controlled automatically by level sensors in the storage tank 30 as will be explained.

Figure 4:
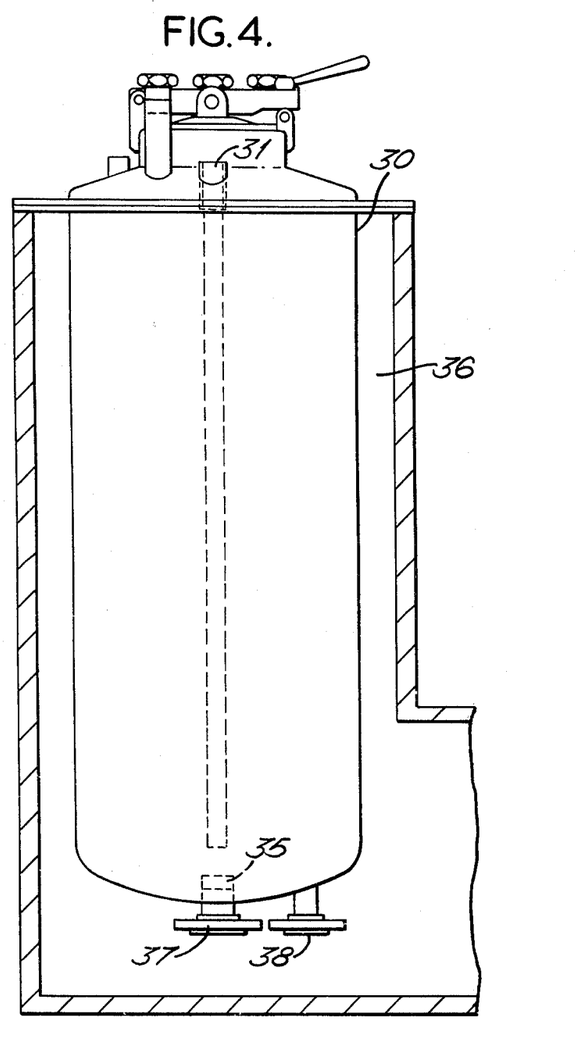
FIG. 4 is a sectioned view of a tank for storing uncured heated urethane elastomer.

The storage tank 30 which is supplied with heated Adiprene from the degassing machine 11 is shown in more detail in FIG. 4. It comprises a cylindrical tank having a capacity of 110 liters the tank being surrounded by an insulated oil jacket 36 containing 50 gallons of heated oil for maintaining the temperature of the Adiprene substantially constant at 90°±2° C. The inlet 31 from the degassing machine 11 comprises a pipe extending beneath the level of Adiprene in the tank to near the bottom of the tank, so as to avoid air becoming entrained in the Adiprene, the inflowing liquid causing the Adiprene in the tank to be continually agitated to avoid hot spots in the Adiprene.

The tank 30 is provided with high and low level sensors 32, 33 (see FIG. 1) which are connected to the automatic valve 26 of the degassing machine 11. When the level of Adiprene in the tank falls below the low level sensor 33 (40 liters) it operates the valve 26 so as to admit more Adiprene from the degassing machine 11 until the level reaches the high level sensor 32 (90 liters) which then resets the valve 26 to cut off the supply of Adiprene to the tank. An extra low level sensor 34 corresponding to 18 liters is also provided connected to an alarm device to serve as a low level warning.

From the bottom of the storage tank 30, which is provided with an outlet fitted with a filter 35, the Adiprene is pumped at a pressure of 28 lb/sq.in. to the mixing head and back to the tank via closed loop receiving lines 37 and 38, the return line 38 being connected to the bottom of the storage tank so that the recycling liquid also serves to keep the Adiprene thoroughly stirred in the tank.

The supply and return lines 37 and 38 are flexible hoses each surrounded by a coaxial hose slightly larger in diameter thereby affording an annular duct surrounding each line 37, 38 for circulating hot oil from the oil jacket 36 of the storage tank 30 to the mixing head 4 and back to the oil jacket 36, the flow of oil being in the opposite direction to that of the Adiprene. The purpose of circulating the Adiprene continuously to and from the mixing head 4 and the oil counterflow is to ensure that the Adiprene is continually available at the mixing head whenever it is required and to ensure that the Adiprene and the Adiprene ducts in the mixing head 4 are maintained at the constant temperature of 90°±2° C.

Referring next to the MOCA supply line 2, there is provided a continuous MOCA melter and storage tank 40, the tank being connected to the mixing head 4 by lines 41 and 42 as will be explained. The MOCA raw material is in the form of pellets or granules which are melted as required in a special melting arrangement and fed in liquid form to a temperature controlled storage reservoir underneath the melting section.

Figure 5:
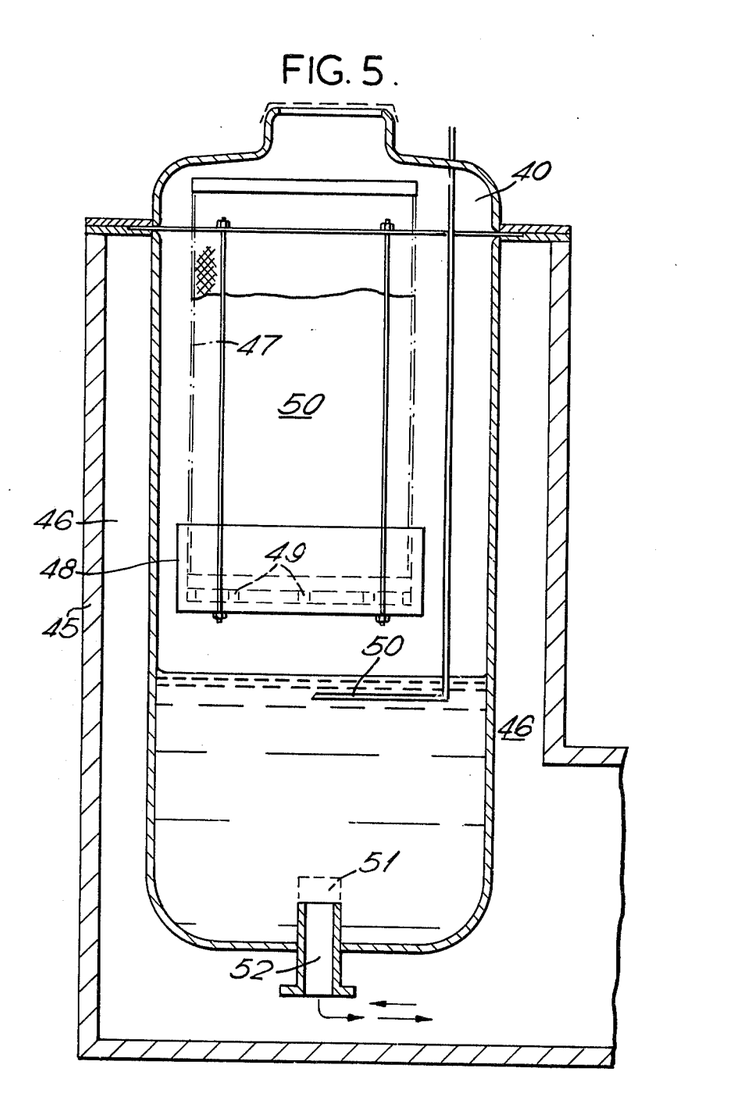
FIG. 5 is a sectioned view showing a combined heating and storage arrangement for a curing agent.

The details of the MOCA melter and storage reservoir are shown in more detail in FIG. 5. The tank 40 is a cylindrical 110 liter capacity vessel which is surrounded by an insulated oil jacket 45 affording an oil reservoir 46 around the tank 40 containing 35 gallons of oil which is maintained at 120°±15° C. Inside the upper part of the tank 40 there is a cylindrical wire basket 47 which is supported at its lower end on a heating tray 48 provided with electrical heating elements 49 controlled at 140° C. by an on/off thyristor controller. A temperature sensor (not shown) is provided near the top of the heating tray for sensing the temperature of the melted MOCA; if the temperature rises too much the temperature sensor operates the thyristor controller to switch off the heating elements 49. The wire basket and heating tray occupy approximately the upper half of the tank 40, the lower half constituting a storage tank for the melted and heated MOCA.

In use the MOCA granules or pellets 50 are placed into the wire basket 47. When the heating elements 49 in the heating tray 48 are switched on, the MOCA at the bottom of the wire basket will be melted and the liquid MOCA will collect in the tray and then overflow and fall into the lower half of the tank 40 where the liquid MOCA is maintained at 120°±5° C. by the surrounding oil jacket. The tank 40 is provided with a level sensor 50 which can be connected to an indicator so that an operator knows when the heating tray shoul be switched on to heat more MOCA granules. By means of further level sensors and other suitable devices, the control of the heating tray and the recharging of the wire basket 47 with MOCA pellets may be arranged to be entirely automatic, so as to keep the level of liquid MOCA between predetermined levels. An extra low level sensor can be also provided in the lower part of the tank to provide a warning signal if the liquid MOCA level falls too low.

From the bottom of the tank 40, via a filter 51 and outlet 52, the liquid MOCA at approximately 120° C. is pumped at a pressure of 28 lb/sq.in. to the mixing head 4 and back to the tank 40 via the closed loop recycling lines 41 and 42, the return line 42 being connected to the bottom of the tank 40 so that the recycling liquid serves to keep the liquid MOCA agitated in the tank to avoid hot spots in the liquid MOCA.

The supply and return lines 41 and 42 are flexible hoses and each hose is encased within oil conducts (not shown) in exactly similar manner to that described for the Adiprene supply hoses 37 and 38.

Figure 6:
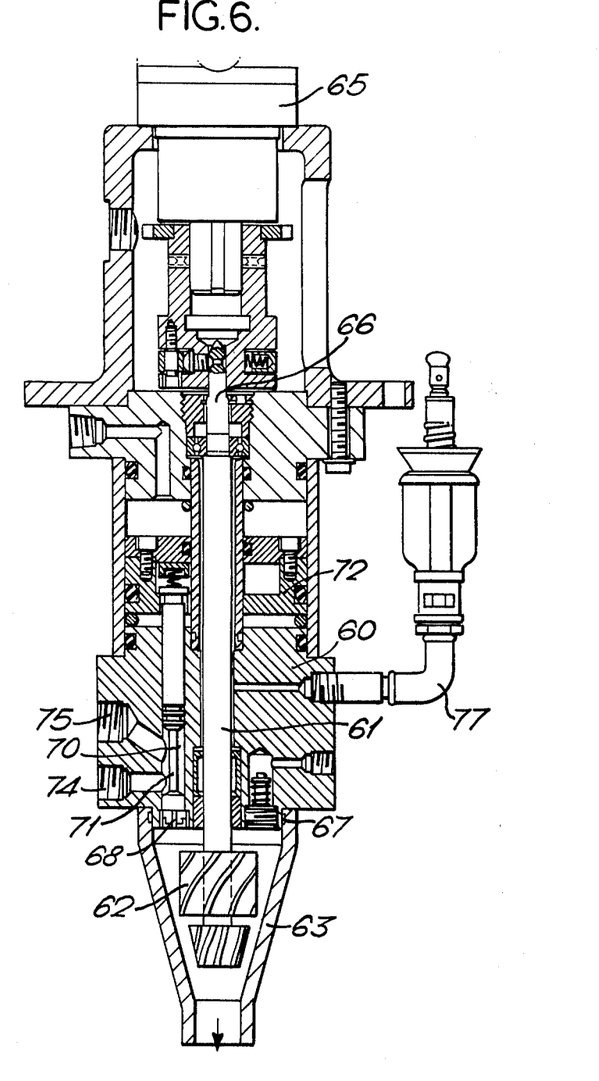
FIGS. 6 and 7 are views showing a mixing head for mixing the heated urethane elastomer and the curing agent therefor.
Figure 7:
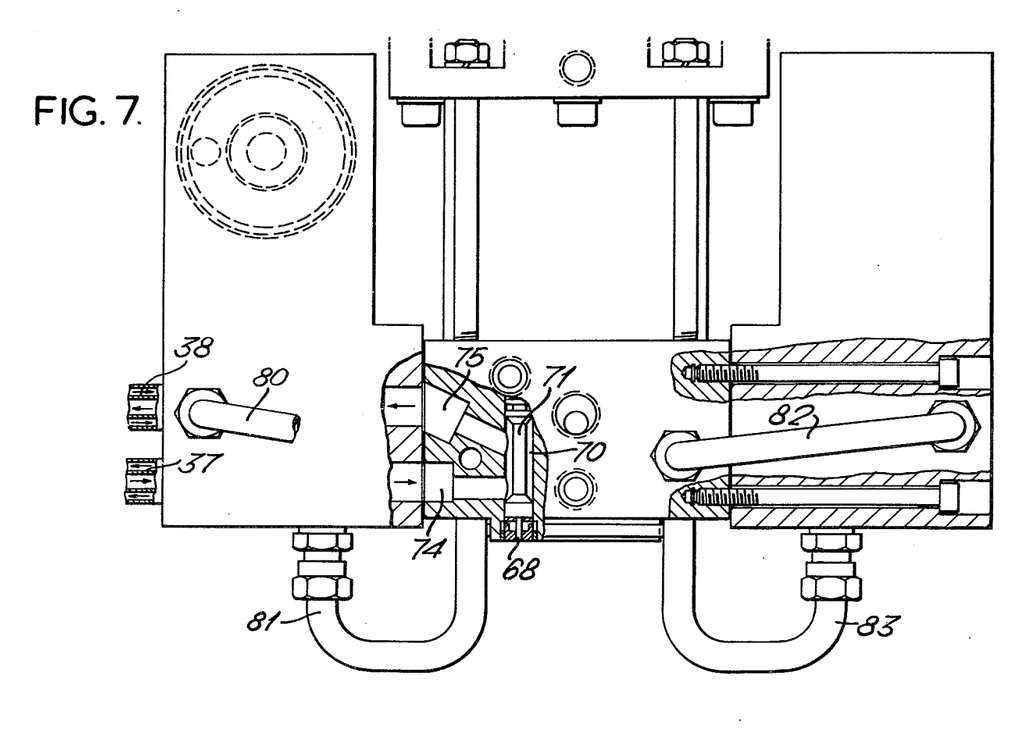

The mixing head 4 is a standard unit for mixing polyurethane reagents and the construction is shown in detail in FIGS. 6 and 7. Referring to FIG. 6, the mixing head 4 comprises generally a housing 60 having a centrally-mounted shaft 61 mounted via a quick release connection 66 at its upper end and arranged to be driven by an oil motor 65. The lower end of the shaft carries a mixing tool 62 situated in a nozzle 63 which is mounted on the main housing 60 by a quick release screwed connection 67.

Six orifices 68 some of which are used for discharging the Adiprene and Moca reagents are provided on the bottom of the main housing 60, the orifices being arranged with their centres on a circle about the central axis of the shaft 61. In the present construction two orifices are used for Adiprene and one for MOCA.

Above each orifice 68 for discharging the Adiprene and MOCA there is a passageway 70 containing a longitudinally-movable plunger valve 71, the plunger valves 71 for each orifice being connected to a common piston member 72 which can be reciprocated by means of compressed air so that the plunger valves 71 can all be lifted or lowered simultaneously.

The passageway 70 above each orifice connects a reactant inlet port 74 and a reactant outlet port 75 to which are connected the supply and return recycling lines 37 and 38 in the case of the Adiprene circuit, and 41, 42 in the case of the MOCA circuit.

In operation, when each plunger valve 71 is in its lower position its bottom end closes the orifice and the reactants, Adiprene and MOCA simply recycle through the ead. For mixing and discharge of the reactants the stirring shaft 61 is driven at approximately 4500 r.p.m., and, by means of compressed air, the plungers 71 are lifted to open the Adiprene and MOCA orifices 68 and to close off the outlet ports 75 so that Adiprene and MOCA instead of being recycled back to their respective tanks are pumped through the orifices 68. The rotating mixing tool 62 on the shaft 61 rapidly and thoroughly mixes the reactants and they are then discharged through the lower end of the nozzle 63. The shaft 61 is lubricated via a lubricant inlet connection 77.

In the present construction the diameters of the supply lines for Adiprene and MOCA, the supply pumping pressure from the storage tanks and the sizes of the orifices 68 are arranged to give a mixture ratio of Adiprene to MOCA of 8:1.

As explained above the Adiprene and MOCA supply and return lines 37, 38 and 41, 42, are enclosed by oil pipes for circulating hot oil respectively from the oil jackets of the tanks 30 and 46 to the mixing head 4 and back to the tanks. This ensures that the lines 37, 38 and 41, 42 and the mixing head 4 are maintained at the required temperatures of the reactants. The oil is circulated through the side of the mixing head 4 as indicated in FIG. 7 via pipes 80 and 81 on the Adiprene side and pipes 82, 83 on the MOCA side.

After mixing and discharge of the reactants it is necessary to flush out the mixing head and nozzle 63 with solvent to prevent any of the mixture left in the nozzle 63 and on the mixing tool 62 from becoming solid and fouling the operation of the mixer. For this purpose one of the orifices 68A is provided with an inlet port 85 for supplying a cleaning solvent: methylene chloride. This is supplied, as shown in FIG. 1, from a drum 86 which supplies a solvent tank 87 from which the solvent can be pumped to the head 4.

Figure 8:
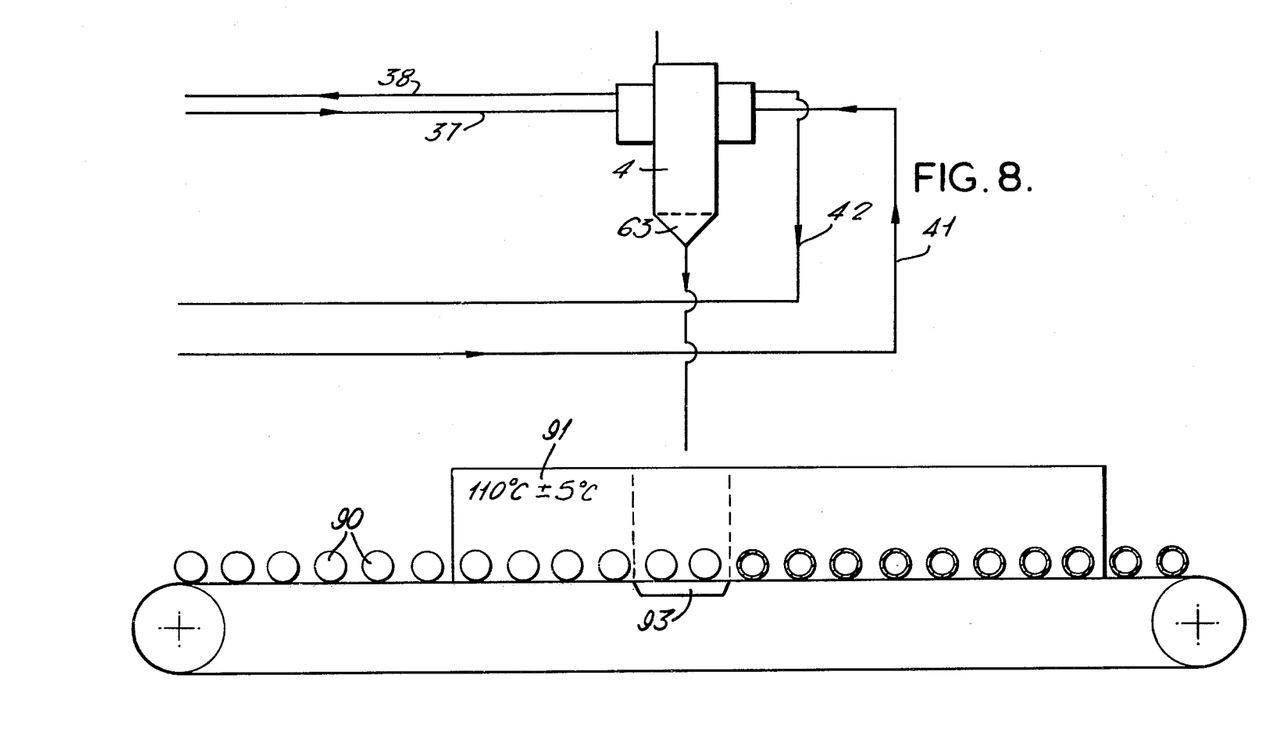
FIG. 8 is a sketch showing one application of polyurethane produced according to the present invention.

In the final stages of the specific embodiment described, the polyurethane is fed from the nozzle 63 of the mixing head 4 directly into a pipe to be lined. The lining technique is described briefly above and illustrated diagrammatically in FIG. 8 of the drawings. The pipes 90 are first cleaned and then preheated in an oven 91 at 110°±5° C. After preheating, the pipes are moved in turn to an injection and spinning station 93 where the pipes are first inclined to a small angle and the polyurethane mix is injected at a rate of 10 kg./min. After injecting the required amount of mix, injection is stopped, the pipe 90 is lowered to a horizontal position and then spun at 800–900 r.p.m. to distribute the polyurethane around the pipe. Spinning is continued for approximately ½ hour to allow the polyurethane to solidify. After spinning, the lined pipes are kept in the oven 91 for a further 2½–3 hours to complete the curing of the polyurethane lining.

The lining technique does not constitute the main feature of the present invention and is therefore not described in greater detail.

Figure 9:
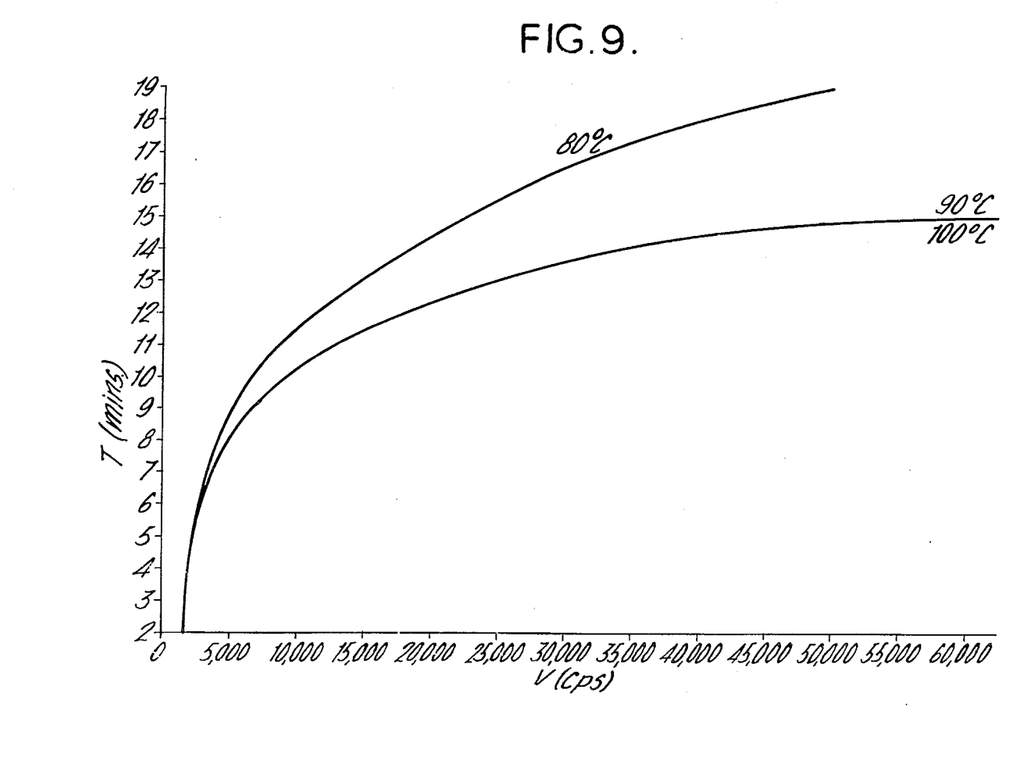
FIG. 9 is a viscosity/time graph for the mixed urethane and curing agent of the specific embodiment.

The viscosity of the mixed Adiprene and MOCA is an important factor in the lining technique. The pot life of the mixture at around 100° C. is approximately 10–20 mins. and it is necessary therefore to ensure that the injection of the mix is completed within at most 5 mins. after mixing so that the spinning of the pipe to distribute the lining can be carried out while the polyurethane is still workable. A typical graph of the variation of the viscosity of Adiprene/MOCA mixture with time is shown in FIG. 9 of the drawings.

In the system described above for the reactant preparation the Adiprene is stored in the tank 30 at approximately 90° C. This means that the Adiprene can be kept for up to 16 hours before it begins to degrade which is adequate time to ensure that continuous processing can be carried out since as the Adiprene is continually used it will not remain in the tank for longer than 16 hours. If the plant is shut down, for example overnight, the Adiprene is allowed to cool the storage tank being fitted with a nitrogen blank to ensure that moist air does not affect the Adiprene. When the plant is re-started the cool Adiprene in the tank 30 can be heated to 90° C. in about 3 hours by heating the oil in the jacket surrounding the tank. The preferred temperature range for storing Adiprene in the tank 30 and supplying it to the head 4 during operation is 85°–100°

C. though it is believed that the Adiprene may be satisfactory if kept and supplied in the range 75°–110° C.

The MOCA is maintained in the tank 40 at 120°±5° C. The preferred range is 110° to 130° C. though it may be stored and supplied to the head at between 105°–140° C.

During shut-down the MOCA in the tank 40 is allowed to cool and it can also be reheated to its working temperature in about 3 hours by heating the oil in the jacket surrounding the tank 40.

It will be appreciated that the process according to the invention of preparing the reactants utilizing the degassing and heating machine and the storage tanks for Adiprene and MOCA makes the system very suitable for almost entirely automatic operation. Indeed, not only the preparation of the reactants, but the mixing and delivery of the polyurethane to the pipes, the lining techniques and the curing stage could also be readily adapted for automatic continuous production.

We claim:

1. A continuous process for lining pipes with a thermosettable polymer which can be introduced into the pipes in the form of a liquid mixture of prepolymer and curing agent, which mixture is capable of setting to a resilient solid material, the process comprising:
   a. heating the prepolymer to a temperature in the range in which the curing agent reacts with the prepolymer in liquid form to cure the latter;
   b. degassing the prepolymer;
   c. transferring the heated and degassed prepolymer to a first storage tank which is maintained at a substantially constant temperature within the said range;
   d. providing the curing agent in liquid form at a temperature at which it is capable of curing the prepolymer and below that at which the curing agent deteriorates;
   e. storing the liquid curing agent in a second storage tank which is maintained at a substantially constant temperature below that at which the curing agent deteriorates;
   f. transferring the heated prepolymer and the liquid curing agent continuously in recycling circuits from the first and second storage tanks respectively to discrete ducts in a mixing head and back to the respective storage tanks, the mixing head being operable continuously or intermittently to stop the flow of prepolymer and curing agent back to their respective storage tanks and to mix and then discharge the mixture of prepolymer and curing agent;
   g. arranging each pipe, in succession, with its longitudinal axis inclined at a predetermined acute angle to the horizontal;
   h. introducing into an upper part of the inclined pipe a selected amount of the liquid mixture from the mixing head which is operated for a predetermined period of time to mix the prepolymer and the curing agent passing therethrough and discharge the resulting mixture flowing therefrom at a substantially constant predetermined rate directly into the pipe, the pipe being held stationary while the liquid material is introduced, the angle of inclination of the pipe and the rate of introduction of the liquid mixture being so arranged that the liquid mixture which is first introduced into the pipe flows along the inside wall of the pipe to a predetermined lower part of the pipe in the same time as that for completing the introduction of the selected amount of liquid mixture whereby the material is distributed along a length of the pipe;
   i. thereafter shifting the pipe to a position in which its longitudinal axis is horizontal and then spinning the pipe about its longitudinal axis to distribute the polymer mixture around the inside of the wall of the pipe, spinning being continued until the polymer has set.

* * * * *